United States Patent
Yamaura et al.

(10) Patent No.: US 6,827,748 B2
(45) Date of Patent: Dec. 7, 2004

(54) FUEL CELL AND METHOD FOR PREPARATION THEREOF

(75) Inventors: Kiyoshi Yamaura, Kanagawa (JP); Minehisa Imazato, Tokyo (JP); Toshiaki Kanemitsu, Kanagawa (JP); Nobuaki Sato, Kanagawa (JP); Kenji Katori, Kanagawa (JP); Katsuya Shirai, Kanagawa (JP); Koichi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 09/967,312

(22) Filed: Sep. 28, 2001

(65) Prior Publication Data

US 2002/0110724 A1 Aug. 15, 2002

(30) Foreign Application Priority Data

Sep. 29, 2000 (JP) ..................................... P2000-301409
Jan. 19, 2001 (JP) ..................................... P2001-012207

(51) Int. Cl.$^7$ .......................... H01M 6/00; H01M 4/86; H01M 4/90; H01M 4/96; B05D 5/12
(52) U.S. Cl. .......................... 29/623.5; 429/40; 429/44; 427/115
(58) Field of Search .................... 429/40, 44; 29/623.5; 427/115

(56) References Cited

U.S. PATENT DOCUMENTS

| | | | | |
|---|---|---|---|---|
| 4,594,297 A | * | 6/1986 | Polak et al. | 429/13 |
| 5,141,604 A | * | 8/1992 | Ayers | 204/59 R |
| 5,470,680 A | | 11/1995 | Loutfy et al. | |
| 5,728,485 A | * | 3/1998 | Watanabe et al. | 429/41 |
| 5,897,766 A | * | 4/1999 | Kawatsu | 204/426 |
| 2002/0006539 A1 | | 1/2002 | Kubota et al. | |

FOREIGN PATENT DOCUMENTS

| | | |
|---|---|---|
| JP | 58126674 | 1/1982 |
| JP | 03167712 | 11/1989 |
| JP | 05258756 | 3/1992 |
| JP | 8138715 | 11/1994 |
| JP | 08148176 | 11/1994 |
| JP | 09035723 | 7/1995 |
| JP | 11279784 | 3/1998 |
| JP | 2001085033 | 9/1999 |

* cited by examiner

*Primary Examiner*—Patrick Ryan
*Assistant Examiner*—Julian Mercado
(74) *Attorney, Agent, or Firm*—Bell, Boyd & Lloyd LLC

(57) ABSTRACT

A fuel cell that includes a proton conductor film with a catalyst layer having a metal component formed thereon is provided. The metal catalyst layer can be formed directly onto the proton conductor film by one of a sputtering process, a vacuum deposition process, a chemical vapor deposition process of the like.

7 Claims, 5 Drawing Sheets

FUEL CELL AND METHOD FOR PREPARATION THEREOF

RELATED APPLICATION DATA

The present invention claims priority to Japanese Patent Document No. P2000-301409 filed on Sep. 29, 2000 and Japanese Patent Document No. P2001-012207 filed Jan. 19, 2001. The above-referenced Japanese Patent Documents are hereby incorporated by reference to the extent permitted by law.

BACKGROUND OF THE INVENTION

The present invention relates to a fuel cell and a method for the preparation thereof.

A need exists for a substitute or alternative clean and economical energy source which may take the place of, for example, fossil fuels, such as petroleum. For example, a hydrogen gas fuel is regarded as a desirable and alternative source of energy.

In this regard, hydrogen has a large amount of energy contained per unit weight and, in use, does not emit noxious gases or gases contributing to global warming. Thus, hydrogen can be utilized as an ideal energy source which is clean and moreover plentiful in supply.

In general, fuel cells have been developed which utilize hydrogen. In general, a fuel cell is capable of recovering an electrical energy from the hydrogen energy. Research and development in this field is continually advancing. It is expected that fuel cells can be made for application in large scale power generation or on-site self-generation of power, as a power source for an electric vehicle or the like.

The fuel cell, in general, includes a fuel electrode, such as a hydrogen electrode, and an oxygen electrode, arranged on both sides of a proton conductor film. By supplying fuel (hydrogen) and oxygen to these electrodes, a cell reaction occurs resulting in an electromotive force. In preparing the fuel cell, the proton conductor film, fuel electrode and the oxygen electrode are routinely molded separately and bonded together.

However, in forming the fuel electrode and the oxygen electrode separately, a variety of inconveniences can arise due to difficulties encountered in handling and general processing regarding same.

For example, if the strength of the fuel electrode or the oxygen electrode is taken into consideration, a certain thickness, for example, a thickness on the order of 100 μm or more, may be needed. However, if the electrode thickness becomes too large, the cell reaction is lowered in efficiency, thus lowering the cell performance.

On the other hand, as the electrode thickness is decreased, the proton conductor film may be handled with difficulty due to its size decreased, to compensate for a decreased electrode thickness, as a fuel cell component separate and apart from the electrodes. Thus, the production of the fuel cell is lowered significantly.

SUMMARY OF THE INVENTION

It is therefore an advantage of the present invention to provide a fuel cell which is easy to manufacture and superior in cell performance, and a method for the preparation of the fuel cell.

Applicants have conducted a variety of research and experiments, and found that layers of a catalyst having a metal component may be effectively used to facilitate the performance of a fuel cell and/or as an oxygen cell.

In this regard, the fuel cell of the present invention can include a layer of a metal catalyst formed on a surface of a proton conductor film which operates or functions as a fuel electrode and/or as an oxygen electrode.

According to the present invention, the metal catalyst layer operates as a fuel electrode and/or as an oxygen electrode and is directly formed on the proton conductor film operating as a support. Thus, it is unnecessary to handle the fuel electrode and/or the oxygen electrode separately and thus take mechanical strength thereof into consideration when manufacturing the fuel cell of the present invention. Consequently, the fuel and oxygen electrodes can be increasingly reduced in thickness such that the cell reaction may proceed efficiently to improve the cell performance as well as the energy density of the fuel cell.

Moreover, in the present invention, the metal catalyst layer in an embodiment can include ventilation openings for supplying the fuel or oxygen gases. By the metal catalyst layer including the ventilation openings for supplying the fuel or oxygen gases, the cell reaction may proceed more efficiently, without obstructing the electrode reaction, thus further improving the cell performance.

Additionally, in an embodiment, the proton conductor film desirably exhibits thermal resistance. In this regard, it is desirable that the proton conductor film is formed by a matrix of a carbonaceous material mainly composed of carbon and into which proton dissociative groups are introduced.

In an embodiment, the present invention also relates to a method for the preparation of a fuel cell including forming a layer of a catalyst metal on a surface of a proton conductor film by one of sputtering, vacuum deposition, chemical vapor deposition ("CVD") or the like processes.

With the method for the preparation of a fuel cell, according to the present invention, electrodes of a fuel cell can be produced by a simplified technique which is based on a gas phase film-forming method.

With the method for the preparation of a fuel cell, according to an embodiment of the present invention, fine particles of a material different from the catalyst metal can be added, or dispersed or sprinkled onto the proton conductor film before forming the layer of the catalyst metal on a surface of the proton conductor film. In an embodiment, after forming the layer of the catalyst metal, the fine particles can be removed to form ventilation openings in the layer of the catalyst metal.

With the method for the preparation of a fuel cell, according to an embodiment of the present invention, the particle size of the fine particles is preferably larger than the thickness of the layer of the catalyst metal. By having the particle size of the fine particles larger than the thickness of the layer of the catalyst metal, ventilation openings can be formed more reliably in the layer of the catalyst metal.

In an embodiment, fine particles of silica are preferably used. In this case, silica powders added by dispersing, sprinkling or the like, on the surface of the proton conductor film can be effectively removed by ion milling or etching employing a fluorine-containing solution or a fluorine-containing gas or other like process.

It should be appreciated that the fine particles can include a variety of different and suitable materials. For example, in an embodiment, fine particles of tin oxide may also be used. In this case, tin oxide powders are added to the surface of the proton conductor film and can be effectively removed by ion milling, etching employing a fluorine-containing solution or a fluorine-containing gas or the like similar to fine particles of silica.

Additional features and advantages of the present invention are described in, and will be apparent from, the Detailed Description of the Invention and the Figures.

DETAILED DESCRIPTION OF THE INVENTION

Figure 1:
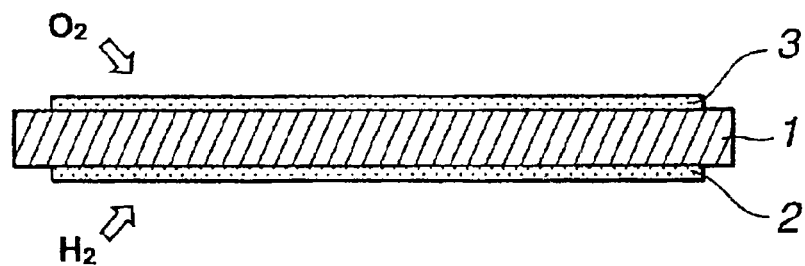
FIG. 1 is a schematic cross-sectional view showing a fuel cell of the present invention.

Referring to the drawings, a fuel cell and a manufacturing method thereof according to the present invention will be explained in detail below.

FIG. 1 shows the structure of a fuel cell according to an embodiment of the present invention. In general, the fuel cell includes a proton conductor film layer or other suitably structured material 1, exhibiting proton conductivity, and layers of metal catalyst 2, 3 formed on both surfaces thereof.

In an embodiment, the material forming the metal catalyst layers 2, 3 includes metal components, such as platinum, palladium, iridium or rhodium, or an alloy containing at least one of these metals or the like. In an embodiment, the catalyst layer is directly formed on the proton conductor film 1 by e.g., sputtering or other like processes.

The fuel cell according to the present invention can utilize the metal catalyst layers 2, 3 directly as a fuel electrode or as an oxygen electrode.

In this regard, a fuel electrode and/or an oxygen electrode separately formed, e.g., of a carbonaceous material, on the metal catalyst layers 2, 3 is not required. As previously discussed, the metal layers can function or operate like the fuel electrode and/or oxygen electrode whereas these metal catalyst layers may be reduced significantly in thickness as compared to typical fuel electrodes and/or oxygen electrodes. In an embodiment, the thickness of the metal catalyst layers 2, 3 ranges on order from about 10 Å to 100 Å. The fact that the metal catalyst layers 2, 3 can be reduced appreciably in thickness can lead to significantly improved energy density.

Figure 2:
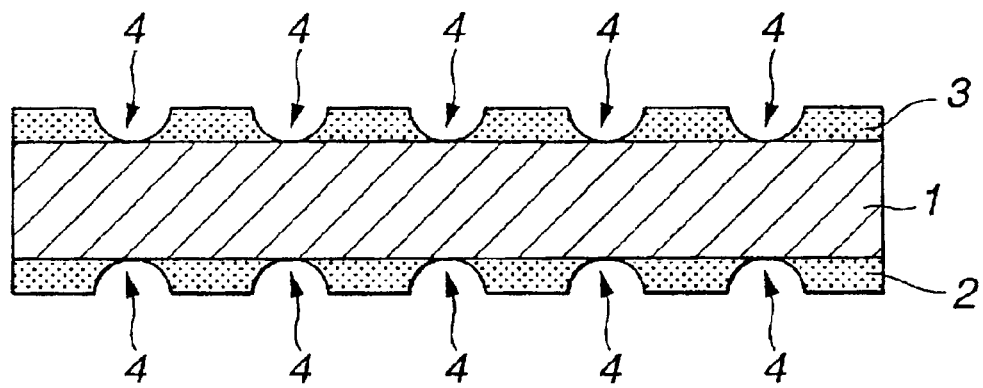
FIG. 2 is a schematic cross-sectional view showing a portion of electrodes of the fuel cell in an embodiment of the present invention.

In another embodiment of the fuel cell of the present invention, these metal catalyst layers 2, 3 are provided with ventilation openings 4, as shown in FIG. 2. Applicants have discovered that the ventilation openings 4 of the present invention can be utilized to supply the fuel gas or the oxygen gas without impediments to the three-phase boundary where the catalyst, proton conductor and the reaction gases meet one another. In this regard, the electrode reaction may be performed more efficiently, without being obstructed, thus further improving the cell performance.

In an embodiment of the present invention, a method of manufacturing the fuel cell includes one or more of a plasma vapor deposition ("PVD") and chemical vapor deposition ("CVD") techniques, such as a sputtering method, vacuum deposition method, or the like to form the metal catalyst layers 2, 3. By using these techniques, the metal catalyst layers 2, 3 may be optimally and efficiently produced.

Figure 3:
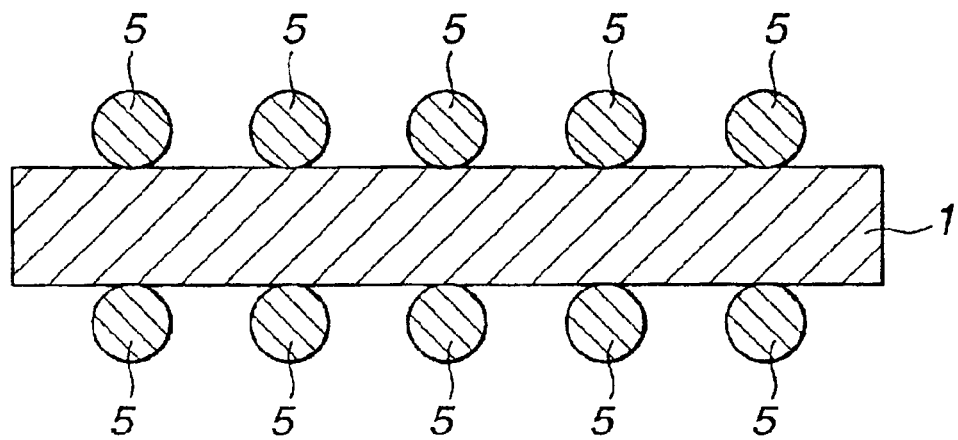
FIG. 3 is a schematic cross-sectional view showing an embodiment of the proton conductor film of the present invention.

In forming the ventilation openings 4 of an embodiment of the present invention, fine particles 5 of a material different from the metal catalyst may be added, for example, by sprinkling, dispersing, or the like on the surface of the proton conductor film 1, as shown in FIG. 3, before forming the metal catalyst layers 2, 3. The fine particles 5 can then be removed after forming the metal catalyst layers 2, 3 to form the ventilation openings 4 in the metal catalyst layers 2, 3.

In an embodiment, the particle size of the fine particles 5 is preferably larger than the thickness of the metal catalyst layers 2, 3. By having the particle size of the fine particles 5 larger than the thickness of the metal catalyst layers 2, 3, the ventilation openings 4 can be formed reliably in the metal catalyst layers 2, 3.

Although the fine particles 5 are preferably formed of silica or tin oxide, various other materials, such as metal compounds including oxides, nitrides, the like or combinations thereof, may also be used provided that the fine particles 5 can be reliably added to the proton conductor layer.

The fine particles 5 may be removed by any method suitable for the material types of the fine particles. For example, if the fine particles 5 are formed of silica, the fine particles 5 of silica may effectively be removed by ion milling or etching employing a fluorine-containing solution or a fluorine-containing gas in an embodiment of the present invention.

If the fine particles 5 are formed of tin oxide, the fine-particles 5 of tin oxide, sprinkled on the surface of the proton conductor film 1, may effectively be removed by ion milling or etching employing a chlorine-containing solution or a chlorine-containing gas.

In the above-described fuel cell, if one 2 of the metal catalyst layers is a fuel electrode, and hydrogen, for example, is supplied thereto, hydrogen can be converted into a proton by the catalytic action of the metal catalyst layer 2 and migrated through the inside of the proton conductor film 1. If the other metal catalyst layer 3 is the oxygen electrode, and oxygen is supplied thereto, the cell reaction can occur to produce the electromotive force.

As the proton conductor film 1, any optional film may be used provided that it exhibits protonic conductivity. For example, a separator material coated with a material exhibiting protonic conductivity may be used.

In an embodiment, the materials usable as the proton conductor film 1 include high molecular weight material capable of conducting protons (hydrogen ions), such as perfluorosulfonic acid resin, for example, Nafion(K) manufactured by Du Pont SA.

Other proton conductor materials include polymolybdenic acids or oxides having a large number of hydrates, such as $H_3Mo_{12}PO_{40} \cdot 29H_2O$ or $Sb_2O_5 \cdot 5.4H_2O$, may also be used.

If placed under wet or moist conditions, these high molecular weight materials can exhibit high proton conductivity at or near ambient temperature.

Taking the perfluorosulfonic acid resin as an example, protons electrically dissociated from the sulfonic acid group is bound with the moisture taken in large quantities into a matrix defined by the high molecular weight material by a hydrogen bond to generate protonated water, that is oxonium ions ($H_3O^+$), such that protons can be smoothly migrated in the high molecular weight matrix in the form of these oxonium ions. So, this type of the matrix material may exhibit appreciably high proton conductivity even at or near ambient temperature.

It should be appreciated that a variety of different and suitable proton conductor materials and proton conducting mechanisms thereof can be utilized in the present invention. For example, composite metal oxides having a perovskite structure, such as Yb-doped $SrCeO_3$. These composite metal oxides having a perovuskite structure, have been found to exhibit protonic conductivity without requiring moisture as the medium for proton conduction. In these composite metal oxides, the protons are believed to be conducted by channeling themselves through oxygen ions that form the skeleton of the perovskite structure.

Since the metal catalyst layers 2, 3 can be directly formed by sputtering or other suitable process, the proton conductor film 1 preferably exhibits certain thermal resistance characteristics essential to the selection thereof.

In the sputtering method, the temperature of the proton conductor film 1 is not less than about 120° C. in an embodiment. For example, the temperature can be evaluated by mixing a particulate of In within the proton conductor film. The temperature can be determined by detecting dissolution of the In particles. In general, such detection of dissolution could be observed with scanning electron microscopy ("SEM") following sputtering with In particles (1 $\mu$m in diameter) set on the film. The melting point of the In particles was determined to be about 155° C. using this type of detection technique.

In an embodiment, a proton conductor material composed of a carbonaceous material mainly composed of carbon and proton dissociative groups introduced in the carbonaceous material can be desirably used in view of its material characteristics, such as thermal resistance and its ability to conduct protons without humidification.

Such a proton conductor material is high in tensile shearing strength (1 t/cm tension: for a film thickness of 25 $\mu$m) even at a temperature exceeding 120° C., so that no shearing is produced, as may be seen from the following Table 1:

TABLE 1

| heating temperature (° C.) | shearing |
| --- | --- |
| 40 | none |
| 60 | none |
| 80 | none |
| 100 | none |
| 120 | none |
| 140 | none |
| 160 | none |
| 180 | none |
| 200 | occurred |

It should be noted that the "proton dissociative groups" mean functional groups from which protons ($H^+$) can be detached due to electrical dissociation.

In an embodiment, dissociative groups include —OH, —$OSO_3H$, $SO_3H$, —COOH; and —$OPO(OH)_2$, the like or combinations thereof.

In this type of proton conductor, protons are migrated through the proton dissociative groups to manifest ion conductivity.

The carbonaceous material of the proton conductor that forms a matrix structure can include any suitable material, such as, a material mainly composed of carbon. It is however necessary for the ion conductivity of such material to be larger than the electronic conductivity after introducing the proton dissociative groups into the matrix structure of the carbonaceous material.

In an embodiment, a carbon cluster, as an aggregate of carbon atoms, or tubular carbon materials, or so-called carbon nano-tubes, may be used as the carbonaceous material.

Among a variety of carbon clusters, fullerene, a fullerene structure having an opening end at least at a portion thereof, or a diamond structure, are preferred.

The carbon cluster is explained below in detail.

A cluster routinely means an aggregate of several to hundreds of atoms, bound or flocculated together. If those atoms are carbon atoms, such flocculation or aggregation improves proton conductivity while simultaneously maintaining its chemical properties to provide for sufficient material strength and for ease in forming layers. A "cluster mainly composed of carbon" means an aggregate of several to hundreds of carbon atoms regardless of the type of the carbon-carbon bonds. Such cluster may, however, not be composed only of carbon atoms but also such that other atoms may be present in addition to the carbon atoms. Thus, in order to encompass such case, an aggregate, the major portion of which is composed of carbon atoms, is termed a carbon cluster. Examples of these aggregates are shown in FIGS. 4 to 7 in which the proton dissociative groups are omitted. It should be appreciated that a variety of different and suitable clusters or carbon clusters can be used as proton conducting materials.

Figure 4:
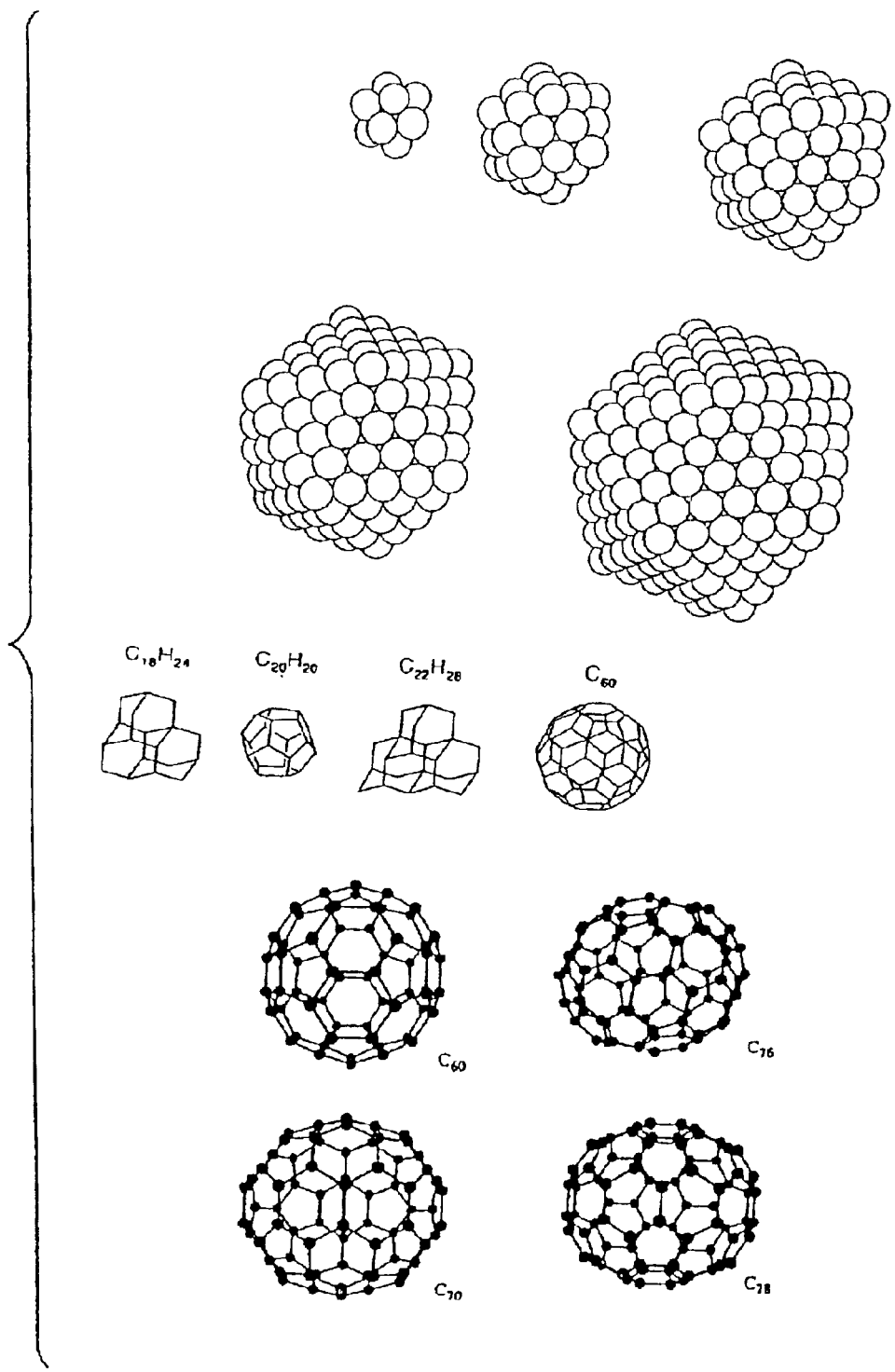
FIG. 4 is a schematic view showing various examples of a carbon cluster of the present invention.
Figure 5:
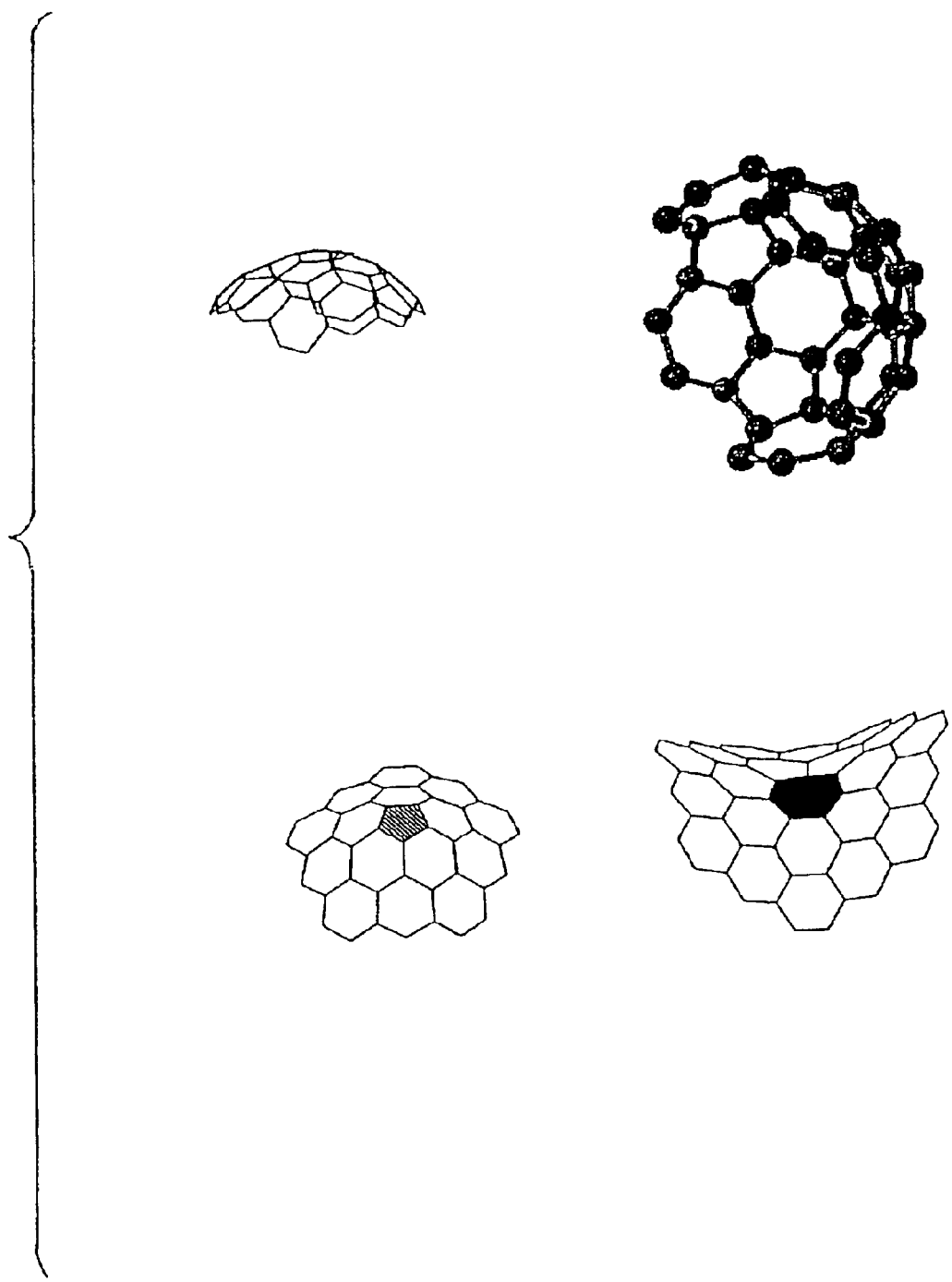
FIG. 5 in a schematic view showing another example of a carbon cluster (e.g., a partial fullerene structure) of the present invention.
Figure 6:
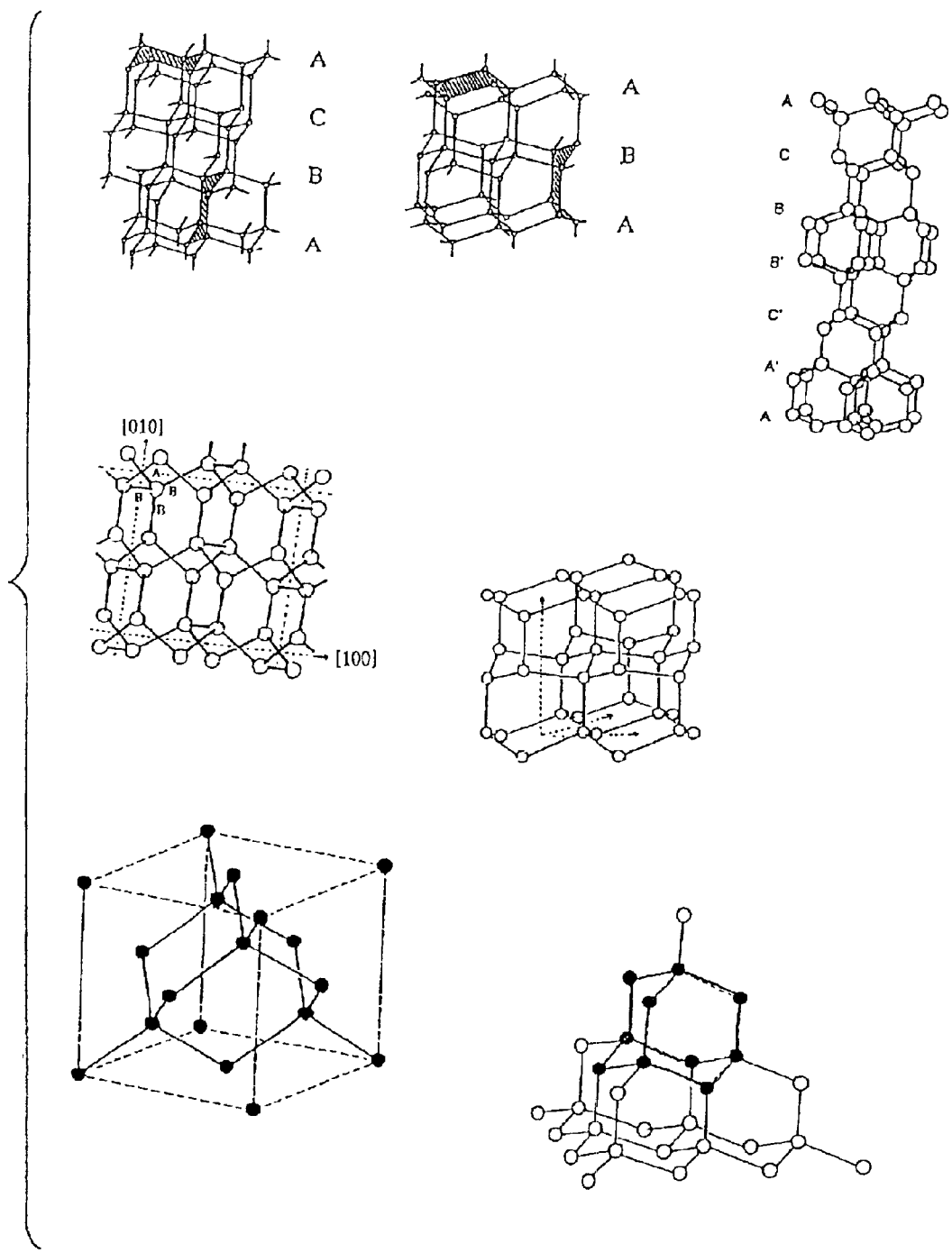
FIG. 6 is a schematic view showing still another example of a carbon cluster (e.g., a diamond structure) of the present invention.

FIG. 4 shows a variety of carbon clusters, each composed of a large number of carbon atoms and each having the structure of a closed surface similar to that of a sphere, an elongated ball or other suitable structure. In FIG. 4, molecular fullerenes are also shown. FIG. 5 shows a variety of carbon clusters, the spherical structures of which are partially interrupted. These types of the carbon clusters feature open ends in the structures. A large number of such structures may be seen as by-products in the process of the fullerene manufacturing process by, for example, arc discharge. If the major portion of the carbon atoms of the carbon cluster are bound in an $Sp^3$ bond, a diamond structure is produced, such as is shown in the structure of the various clusters shown in FIG. 6.

Figure 7:
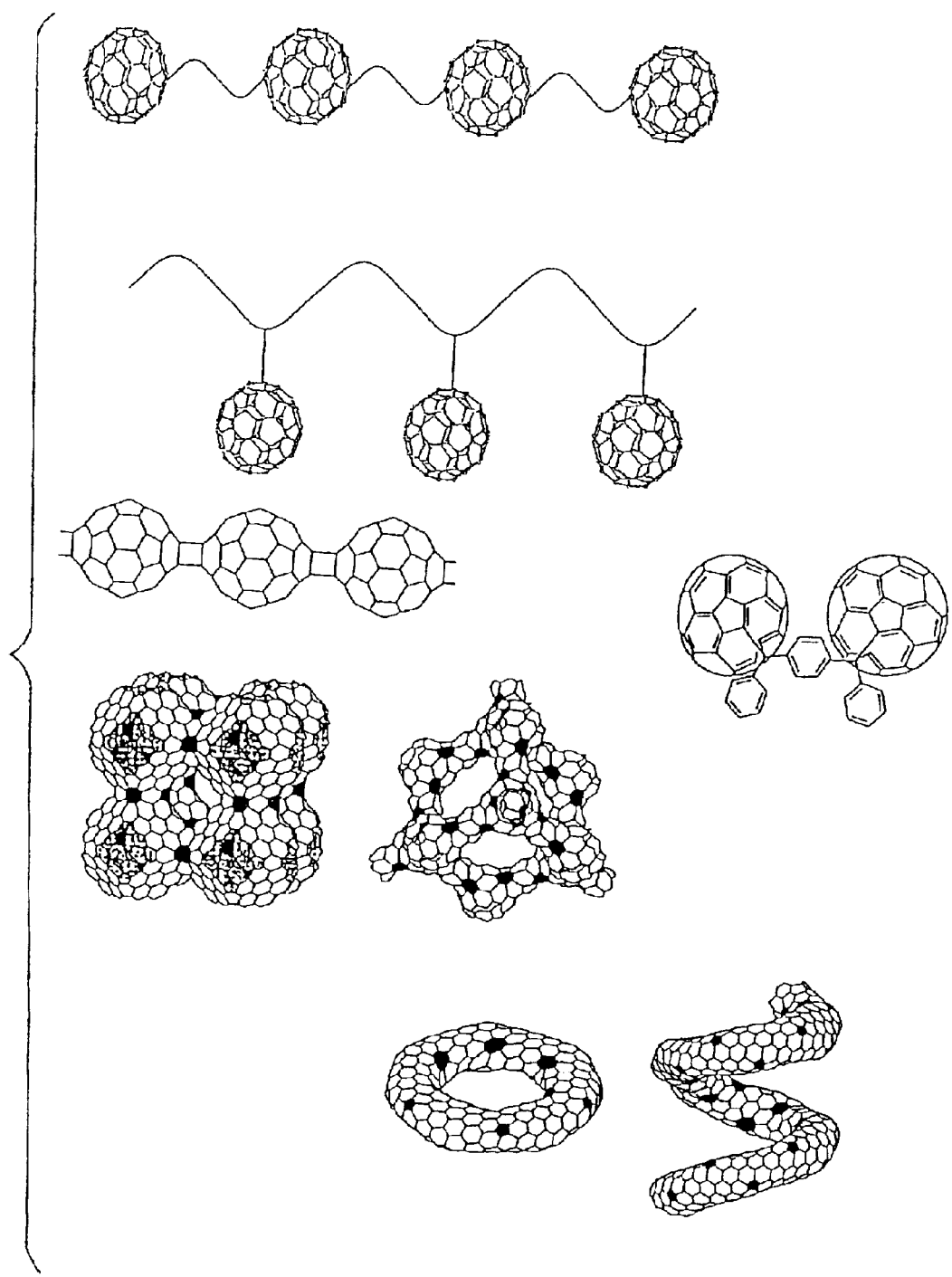
FIG. 7 is a schematic view showing yet another example of a carbon cluster (e.g., a number of clusters bonded together) of the present invention.

FIG. 7 shows several examples in each of which different clusters are bound together. The present invention may be applied to this type of the structure.

In the proton conductor which contains, as main component, the aforementioned carbonaceous material having proton dissociative groups, protons tend to be dissociated from the groups, even under dry conditions. Moreover, these protons are able to exhibit high conductivity over a wide temperature range including ambient temperature, such as a temperature range at least from about 160° C. to about −40° C. Although this type of proton conductor exhibiting sufficient proton conductivity even in a dried state, the presence of the moisture may be tolerated. Such moisture may result from environmental conditions.

According to an embodiment of the present invention, the metal catalyst layers 2, 3 are directly formed on the proton conductor film 1 composed of the aforementioned materials.

As a technique for forming the metal catalyst layers 2, 3, at least one of a PVD technique and a CVD technique, such as sputtering, vacuum deposition, or the like, may be used according to an embodiment of the present invention.

EXAMPLES

The present invention is now explained based on experimental testing and results thereof. In this regard, fuel cell samples were prepared in accordance with embodiments of the present invention and tests on power generation were conducted to evaluate their characteristics.

Example 1

First, a proton conductor film, about 0.1 $\mu$m in thickness, containing hydrogen sulfate esterified fullerenol (where fullerenol is a fullerene compound with —OH proton disssociative groups) and polyvinyl alcohol as a binder, was prepared.

This proton conductor film was placed in a reaction chamber of a DC sputtering device CCS1200 (trade name of a product of TOKUDA CO, LTD.) having a platinum target of about 5 inches in diameter. The inside of the reaction chamber was evacuated to about 10 Pa or less. An argon gas was then introduced into the reaction chamber to set the pressure in the reaction chamber to about $1.33 \times 10^4$ Pa. Using a platinum piece as a target, Radio frequency (RF) sputtering was carried out at an output of about 100 W to form a platinum film of about 10 nm in thickness on each major surface of the proton conductor film.

The so produced proton conductor film, including a catalyst layer composed of a platinum film on both of its major surfaces, was built into a fuel cell. One of these platinum films was used as a fuel electrode, while the other was used as an oxygen electrode. A hydrogen gas, with a purity not lower than about 99.9%, was supplied at one atmospheric pressure to the fuel electrode, while an oxygen gas with a purity not lower than about 99.9%, was supplied at one atmospheric pressure to the oxygen electrode. In this regard, a power generation test was conducted.

As a result of the above-described power generation test, an output of about 40 mW/cm$^2$ was obtained at an output voltage of about 0.6 V in the fuel cell of Example 1. The fuel cell of Example 1 was confirmed to be operating normally as a fuel cell to develop a satisfactory output. That is, it may be said that a fuel call having a satisfactory output can be realized by forming a platinum film as a layer of a metal catalyst on each major surface of the proton conductor film, so that one of the platinum films is used as a fuel electrode and the other is used as an oxygen electrode.

Example 2

In Example 2, silica powders with an average particle size of about 50 nm were added, for example, by dispersing, sprinkling or the like on each major surface of the proton conductor film prepared in Example 1 at a rate of about 0.1 mg per cm$^2$.

On each major surface of the proton conductor film with silica powders, a platinum film of about 10 nm in thickness was formed in the same way as in Example 1, using an RF sputtering device. The proton conductor film, now carrying the platinum film, was then processed with a fluorine-containing solution, to remove the silica powders. This forms ventilation openings on the platinum film surface to facilitate the supply of a hydrogen gas or an oxygen gas, as later explained.

The so produced proton conductor film, including a catalyst layer composed of platinum film on both of its major surfaces, was built into a fuel cell. One of the platinum films layers was used as a fuel electrode, while the other was used as an oxygen electrode. A hydrogen gas, with a purity not lower than about 99.9%, was supplied at one atmospheric pressure to the fuel electrode, while an oxygen gas, with a purity not lower than about 99.9%, was supplied at one atmospheric pressure to the oxygen electrode, by way of carrying out a power generating test.

As a result of the above-described power generation test, an output of about 61 mW/cm$^2$ was obtained at an output voltage of about 0.6 V in the fuel cell of Example 1. The fuel cell of Example 2 was confirmed to be operating at an output which was more satisfactory than with the fuel cell of Example 1. Thus, it may be said that, by forming the ventilation openings in the surface of the platinum film, the output of the fuel cell can be further improved.

Example 3

In Example 3, tin oxide powders with an average particle size of about 100 nm were added on each major surface of the proton conductor film prepared in Example 1 at a rate of about 0.1 mg per cm$^2$.

On each major surface of the proton conductor film with the tin oxide powders, a platinum film layer of about 10 nm in thickness was formed, using an RF sputtering device, in the same way as in Example 1. The proton conductor film, now including the platinum film layer, was etched, using a chlorine gas, to remove the tin oxide powders. This forms ventilation openings for reliably supplying the hydrogen gas or the oxygen gas in the platinum film surface.

The so produced proton conductor film, including a catalyst layer composed of platinum film on both of its major surfaces, was built into a fuel cell. One of the platinum film layers was used as a fuel electrode, while the other was used as an oxygen electrode. A hydrogen gas, with a purity not lower than about 99.9% was supplied at one atmospheric pressure to the fuel electrode, while an oxygen gas, with a purity not lower than about 99.9%, was supplied at one atmospheric pressure to the oxygen electrode, to implement a power generating test.

As a result of the above-described power generation test, an output of about 58 mW/cm$^2$ was obtained at an output voltage of about 0.6 V in the fuel cell of Example 3. The fuel cell of Example 3 was confirmed to be operating at an output which was more satisfactory than with the fuel cell of Example 1. Thus, it may be said that, by forming the ventilation openings in the surface of the platinum film, the output of the fuel cell can be improved further.

Although the present invention has been described with reference to specific embodiments, those of skill in the art will recognize that changes may be made thereto without departing from the spirit and scope of the invention as set forth in the hereafter appended claims.

What is claimed is:

1. A method of preparing a fuel cell including a proton conductor film layer comprising the steps of:
   providing the proton conductor film layer having a surface and including a material capable of conducting protons; and
   forming a catalyst layer having a metal component on at least a portion of the surface of the proton conductor film layer, wherein a plurality of fine particles of a material different than the metal component are added to the surface of the proton conductor film layer prior to forming the catalyst layer thereon, and wherein the fine particles are removed subsequent to forming the catalyst layer to form one or more ventilation openings.

2. The method according to claim 1 wherein the step of forming the catalyst layer includes forming the catalyst layer by any one of a sputtering process, a vacuum deposition process and a chemical vapor deposition process.

3. The method according to claim 1 wherein the fine particles have a particle size that is greater than a thickness of the catalyst layer.

4. The method according to claim 1 wherein the fine particles are composed of silica.

5. The method according to claim 4 wherein the step of removing the fine particles includes removing the fine particles from the proton conductor film layer by any one of an ion milling process and an etching process employing at least one of a fluorine-containing solution and a fluorine-containing gas.

6. The method according to claim 1 wherein the fine particles comprise tin oxide.

7. The method according to claim 6 wherein the step of removing the fine particles includes removing the fine particles from the proton conductor film layer by any one of an ion milling process and an etching process employing at least one of a fluorine-containing solution and a fluorine-containing gas.

* * * * *